United States Patent [19]

Cotter

[11] Patent Number: 5,344,125
[45] Date of Patent: Sep. 6, 1994

[54] GAS SPRING WITH FILLER VALVE

[75] Inventor: Jonathan P. Cotter, Dearborn, Mich.

[73] Assignee: Diebolt International, Inc., Detroit, Mich.

[21] Appl. No.: 123,638

[22] Filed: Sep. 17, 1993

[51] Int. Cl.⁵ .................................................. F16F 9/43
[52] U.S. Cl. .................................. 267/64.28; 267/119; 267/130
[58] Field of Search ................ 267/119, 130, 64.11, 267/64.28, 118; 188/322.21; 141/6, 40, 4, 3, 349, 98, 392, 57; 91/442, 417 R; 137/102, 493.2, 596, 489; 72/453.13; 92/134, 117 R; 285/92, 924

[56] References Cited

U.S. PATENT DOCUMENTS 5,129,635  7/1992  Holley ..................... 188/322.17 X

*Primary Examiner*—Douglas C. Butler
*Attorney, Agent, or Firm*—Barnes, Kisselle, Raisch, Choate, Whittemore & Hulbert

[57] ABSTRACT

A filler valve and fitting for a gas spring. The filler valve has a body slidably received in a cavity in a housing and movable between a first sealed position for retaining gas within a gas chamber in the spring and a second position for bleeding gas from the chamber to relieve pressure within the chamber. For charging the chamber with gas, a core valve is carried by the body. Preferably, the housing has an exterior configuration and size of a standard flow-through type coupling having a pair of exteriorly threaded portions separated by a central portion with parallel flats constructed and arranged for engagement by a tool to install and remove the housing. The body has opposed effective areas with the effective area adjacent an inlet in the housing being greater than the effective area adjacent the outlet for enabling gas within the chamber to be compressed to a pressure much greater than the supply line pressure. Preferably the ratio of effective areas ranges from about 4:1 to 8:1 and preferably about 6:1 to enable the gas in the chamber to be compressed up to a pressure of about six times the supply line pressure.

21 Claims, 1 Drawing Sheet

GAS SPRING WITH FILLER VALVE

FIELD OF THE INVENTION

This invention relates to gas springs and more particularly to a filler valve for a gas spring.

BACKGROUND OF THE INVENTION

Gas springs are typically utilized to yieldingly resist movement of a body such as a clamping ring for a metal blank in a die in a press for forming sheet metal parts. These springs are generally constructed with an actuating rod connected to a piston or head slidably received in a cylinder having a chamber that is charged through a filler valve in the cylinder to a predetermined pressure, such as 2000 PSI, with an inert gas, such as nitrogen. This provides a gas spring or cushion permitting the rod to yieldably move toward its retracted position when a force, applied externally to the rod, exceeds the opposing force produced by the gas in the chamber acting on the head.

To charge the chamber with gas for a gas spring in a system piped to a remote control panel, a gas supply line is connected to the cylinder through a hose with a nipple or fitting threadably received in a valve cavity in the cylinder which contains the filler valve and communicates with a passage leading to the cylinder chamber. Pressurized gas is introduced into the chamber through the filler valve until the pressure of the gas within the chamber typically reaches the line pressure. The filler valve has a poppet valve body with a core valve which permits only one-way flow of gas during filling of the chamber. The poppet valve body is movable within the cavity between a first sealed position to prevent removal of gas from the chamber and a second position for bleeding gas from the chamber to relieve pressure within the chamber.

The poppet valve body has a first effective area in communication with the gas supply line and a generally opposed second effective area in communication with the passage leading to the cylinder chamber. To enable the gas within the chamber to be compressed to a substantially greater pressure than the pressure of the gas in the supply line, the first effective area is larger than the second effective area. The maximum pressure to which gas within the chamber can be compressed is typically dependent upon the ratio of these effective areas. A gas spring having a filler valve of this construction is disclosed in U.S. Pat. No. 4,838,527.

Although filler valves of this construction have been disclosed to have an effective area ratio in the range of about 4:3 to 4:1, they have been practically limited due to the contruction of a seal on the body between the valve body and cylinder when in the sealed position to a maximum ratio of about 3:1 which limits the maximum pressure to which the gas can be compressed in the chamber during operation before the valve body moves to bleed gas from the chamber. As a result, the use of filler valves of this construction requires a larger chamber volume, a piston with a larger effective area and/or a longer rod and chamber to provide a longer stroke to avoid exceeding this maximum pressure during operation resulting in a larger, less compact gas spring construction. Furthermore, these valves are received in the valve cavity in the cylinder and retained within the cavity by the nipple making them more difficult, time consuming and expensive to service, repair and replace.

SUMMARY OF THE INVENTION

A compact filler valve assembly for a gas spring, preferably, in a piped system, for charging the chamber with pressurized gas and relieving the pressurized gas. The filler valve has a poppet valve body slidably received in a fitting housing and movable between a first sealed position for retaining gas within a gas chamber in a gas spring cylinder and a second bleed position for bleeding gas from the chamber to relieve the pressure within the chamber. For charging the chamber with gas, a core valve is carried by the poppet valve body. For discharging pressurized gas from the chamber, the poppet valve body moves from a closed position in engagement with a seal to an open position communicating the chamber with a bleed passage which preferably communicates with the atmosphere.

The housing is a fitting or nipple with an inlet at one end and an outlet at the other end interconnected by a through passage providing a cavity for slidably receiving the valve body therein. For connection with a gas supply line, the inlet end is threaded for receiving a coupling, and for connection to the gas spring, the outlet end is threaded for connection to a passage in the cylinder communicating with the gas chamber. For engagement by a tool for rotating the fitting to install and remove it, a central portion of the housing has parallel flats. Preferably, the housing has the exterior configuration and dimensions of an adapter coupling for connecting a high pressure hose fitting to a threaded port. To provide a gas-tight seal between the valve body and the housing when the body is in the closed position, the housing has an annular seal or grommet with flanges molded on both sides of the outlet and encircling the outlet for being firmly retained in place during gas flow through the grommet.

To move the valve body to its open and closed positions, it has a first effective area subjected to the inlet gas pressure which is greater than a generally opposed second effective area subjected to the pressure of gas in the chamber. The valve body can be constructed with a ratio of the first to second effective areas from greater than 1:1 to about 8:1, and preferably about 6:1, for producing a gas spring of relatively compact construction, which in operation can compress the gas within the chamber to a maximum pressure of up to about 8 times and preferably 6 times the supply line gas pressure.

Objects, features and advantages of this invention are to provide a gas spring filler and bleed valve which allows gas within the gas chamber to be compressed to a higher pressure, enables a gas spring of more compact construction, enables gas to be bled from the chamber to relieve pressure without requiring a bleed passage in the gas spring, prevents wear and tear of the gas supply line by preventing pressure surges of the gas spring from being transmitted to the gas in the supply line, can have an exterior configuration of a standard small coupling, is quick, inexpensive and easy to install and remove for servicing or replacement, has a seal positively retained in the housing, and is rugged, durable, of simple design, of economical manufacture and easy to assemble and use.

BRIEF DESCRIPTION OF THE DRAWINGS

These and other objects, features and advantages of this invention will be apparent from the following detailed description of the best mode, appended claims, and accompanying drawings in which:

DETAILED DESCRIPTION OF THE INVENTION

Figure 1:
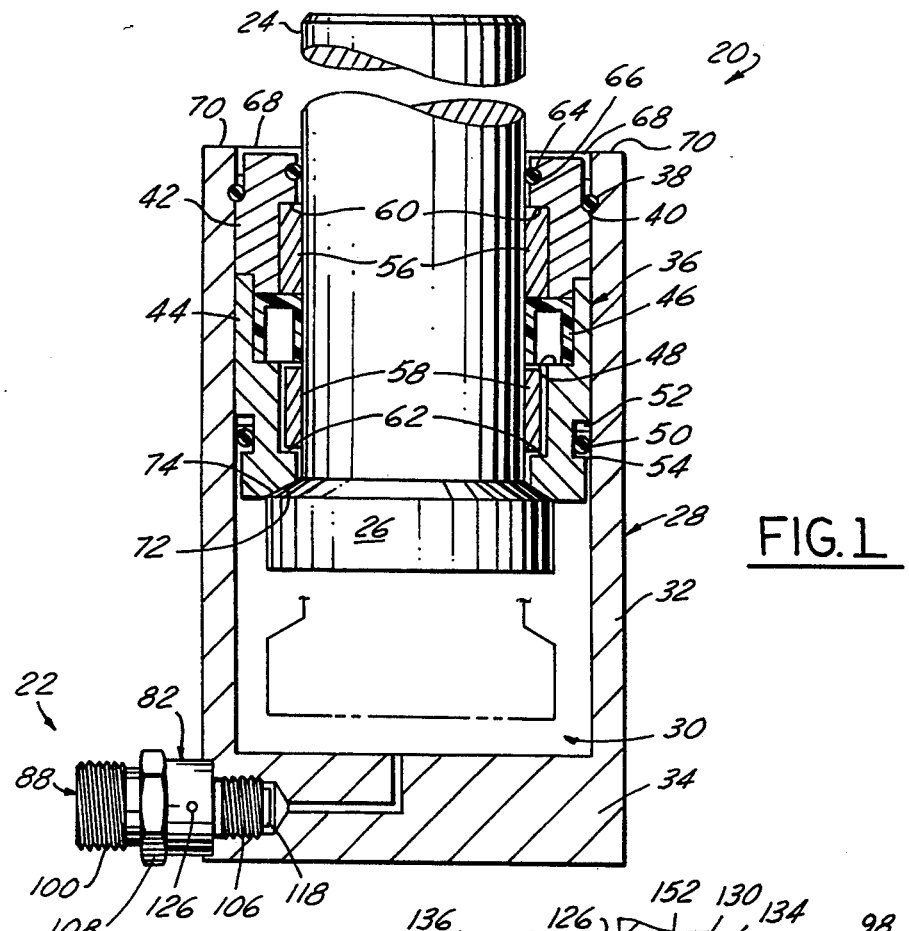
FIG. 1 is a side sectional view of a gas spring and filler valve of this invention.

Referring in more detail to the drawings, FIG. 1 illustrates a single-stage gas spring 20 and a filler valve assembly 22 for facilitating charging the spring 20 with pressurized gas and regulating pressure within the spring 20 during operation. The gas spring 20 has a rod 24 with a piston or head 26 at one end slidably received in a cylinder or tube assembly 28 defining a chamber 30 which when charged with a gas under pressure yieldably urges the piston rod 24 to its extended position and can be moved toward a retracted position (shown in phantom in FIG. 1) in response to force applied to the free end of the rod 24.

Preferably, the cylinder 28 has a separate tube 32 and an end cap 34 permanently secured and gas-tightly sealed to one end of the tube 32 by a circumferentially continuous seam weld (not shown). The rod 24 is slidably received in a bearing and seal assembly 36 disposed in the tube 32 and releasably retained therein by ring segments 38 received in a groove 40 in the tube 32. This assembly 36 has a front housing 42 slidably received, preferably with an interference fit, in a rear housing 44 with a rod seal or gasket 46 received between them in a counterbore 48 in the rear housing 44. A seal is provided between the cylinder tube 32 and the rear housing by an O-ring 50 and a backing ring 52 received in a groove 54 in the rear housing 44.

Preferably, the rod seal 46 is constructed and arranged to have a generally C-shaped cross section for utilizing pressurized gas received within the chamber 30 to provide improved sealing between the rod 24 and bearing and seal assembly 36 to prevent gas loss from the chamber 30. Preferably, the rod seal 46 is made of a low friction and highly wear resistant elastomeric material such as an ultra high molecular weight polyethylene. Such a seal is disclosed in U.S. Pat. No. 4,508,356 and commercially available from Tetrafluor, Inc., 2051 East Maple Avenue, El Segundo, Calif. 90245, under the tradename "Tetralene Multi-Flex Seals".

The piston rod 24 is slidably received in bearings 56, 58 which are received in counterbores 60, 62 in the housings 42, 44. Preferably, the bearings 56, 58 are of a suitable metal such as sintered bronze and preferably are impregnated with a lubricant along with a small quantity of a synthetic high temperature lubricating oil disposed within the chamber 30 to produce long-lasting bearings that permit the rod 24 easily to slidably telescope between the retracted and extended positions. To prevent contaminants from entering the bearing and seal assembly 36, preferably an annular rod scraper 64 is received in a recess 66 in the front housing 42 and a dust cap 68 overlies the assembly 36 and is received and frictionally retained in an end 70 of the tube 32.

Movement of the rod 24 to its extended position is limited by a positive stop provided by cooperation of an end face 72 of the rear housing 44 with a complementary shoulder 74 on the head 26 of the piston rod 24. Movement of the rod 24 to its fully retracted position is limited by the head 26 bottoming on the end cap 34.

During normal operation, preferably, the operating stroke of the rod 24 is short enough that the head 26 does not bottom out on the end cap 34 and there is clearance between them.

Preferably, a gas spring as thus far described is constructed in accordance with U.S. Pat. No. 5,129,635, the disclosure of which is incorporated herein by reference and hence will not be described in further detail.

The end cap 34 of the spring 20 has a threaded cavity 76 for receiving one end of the filler valve assembly 22 and is in communication with a passage 78 that opens into the cylinder chamber 30. The cavity 76 may be of the construction and arrangement described in U.S. Pat. No. 4,838,527, hereby incorporated by reference, or simply a bore in end cap 34 that is threaded for receiving one end of the filler valve 22.

Figure 2:
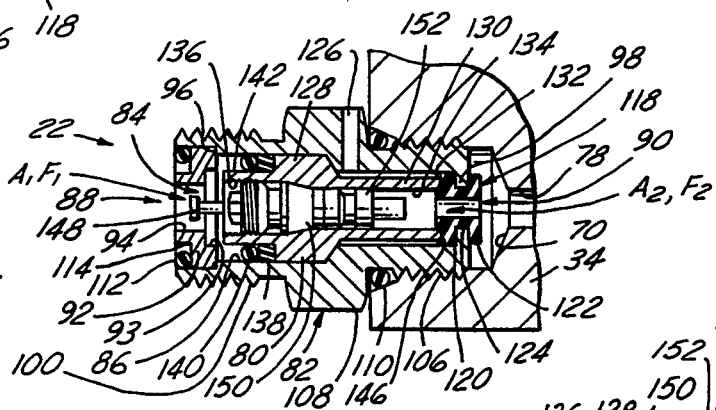
FIG. 2 is an enlarged fragmentary sectional view of the filler valve taken along line 2—2 of FIG. 1.
Figure 3:
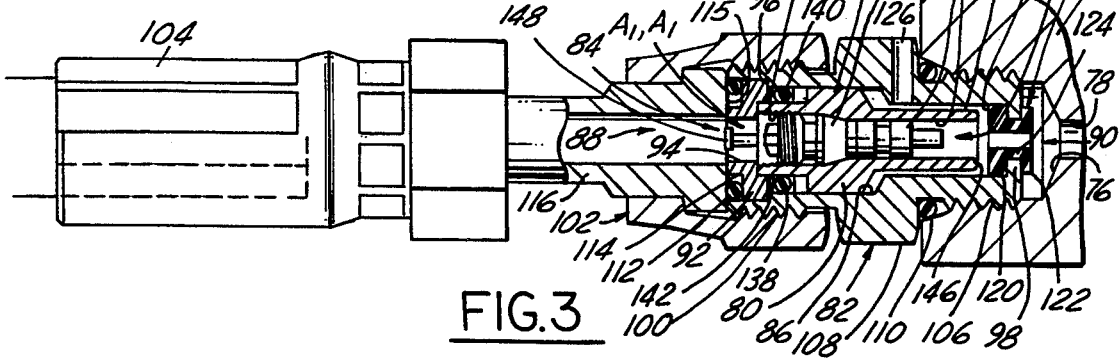
FIG. 3 is an enlarged fragmentary view partially in section of the filler valve and a gas supply hose attached thereto.

Referring to FIGS. 2 & 3, the filler valve 22 has a poppet valve body 80 that is slidably received in a compact fitting housing 82 and is movable between a first sealed position (FIG. 2) for retaining gas within the chamber 30 and a second bleed position (FIG. 3) for bleeding gas from the chamber 30 to relieve pressure within the chamber 30. Carried by the poppet valve body 80 is a check valve such as a core valve 84 to facilitate charging the chamber 30 with gas, such as from a remote control panel (not shown) connected by a gas supply line hose 104.

The fitting housing 82 has a through-passage defining a valve cavity 86 for receiving the poppet valve body 80 therein with an inlet 88 at one end of the cavity 86 and an outlet 90 at its opposite end. To retain the valve body 80 within the cavity 86 during operation, the housing 82 has a retainer disk 92 with a recess 93 complementary with one end of the valve body 80 and an opening 94 therein in communication with inlet 88. Preferably the disk 92 is press fitted into a counterbore 96 in the housing 82 adjacent the inlet 88. At its opposite end, the housing 82 has an integral annular end wall 98 narrowing the diameter of the outlet 90. The housing 82 is preferably of generally cylindrical construction having a threaded portion 100 adjacent its inlet 88 for threadably receiving a coupling 102 of a gas supply line 104 (FIG. 3) and a threaded portion 106 adjacent its outlet 90 for facilitating insertion into the threaded cavity 76 in the end cap 34 of the gas spring 20.

Preferably, the housing 82 has an enlarged central portion with three pairs of parallel flats 108 between threaded portions 100 & 106 that are equiangularly spaced and constructed and arranged in a hexagonal formation for engagement by a tool, such as a wrench (not shown), to insert or remove the filler valve 22 into or from threaded cavity 76 or to facilitate engagement with or disengagement from the gas supply line coupling 102. Preferably, the flats 108 are constructed and arranged for engagement by a $\frac{5}{8}$ inch hexagonal wrench and preferably having a distance between parallel flats of not more than $\frac{5}{8}$ of an inch and a distance between opposing corners where adjacent flats intersect of not more than about $\frac{3}{4}$ of an inch.

To ensure that a gas tight seal is achieved between the fitting housing 82 and the end cap 34 of the gas spring 20, an O-ring 110 of a flexible, resilient elastomeric material is preferably received on the housing 82 between threaded portion 106 and flats 108. To ensure that a gas tight seal is achieved between the fitting housing 82 and the gas supply line coupling 102, an O-ring 112 is preferably received in a recess 114 in the retainer disk 92 for sealingly bearing against an end face 115 of an outlet nozzle 116 of the gas supply line 104 telescopically nested within coupling 102.

Preferably, to produce a fitting housing 82 of compact construction with a minimal radial projection from the cylinder 28 when installed, its axial length from its inlet end 88 to the axial edge of the flats 108 immediately adjacent the tube 32 is no greater than one inch and preferably ¾ inch. Preferably, the fitting housing 82 has an overall axial length of not more than 1½ inches and preferably about 1.10 inches.

The fitting housing 82 preferably has an exterior configuration and dimension which are the same as a standard, commercially available flow through type male fitting for connecting a 7/16 diameter high pressure hose 104 having a complementary coupling 102, thus the fitting housing 82 has a threaded portion 100 having preferably 9/16 diameter with eighteen UNF threads per inch. This permits attachment to the inlet end of a standard 9/16-eighteen female fitting for a high pressure hose commercially available from Parker. The central portion will have a ⅝ inch hex with six flats 108 and the threaded portion 106 of the outlet end will have any one of several conventional threads depending on the particular gas spring to which it will be connected. For example, the threaded portion 106 can have any one of the following: a ½ inch nominal diameter male fitting with twenty threads per inch, UNF or NF, with a SAE-5 O-ring, a 7/16 inch nominal diameter fitting with twenty threads per inch, NF or UNF, with a SAE-4 O-ring, a fitting having an ⅛ inch nominal size with twenty-seven threads per inch which does not require any O-ring seal, and a G⅛ inch nominal size fitting having British Standard Pipe Thread for Pressure Tight Joints (BSPP) with twenty-eight threads per inch and a sealing O-ring in the axially outer face of the enlarged central portion of the housing 82. Housings with outlet portions having the first three of these threads are substitutes for the hose couplings commercially available from Parker sold under the trade name "Seal-Lok" as part numbers 4-5 F50LO-S, 4F50LO-S, 4FLO-S, respectively.

To provide a gas-tight seal between the valve body 80 when in the advanced position (FIG. 2) and the fitting housing 82, a nose seal 118 is received in the outlet end 90 of the housing. Preferably, the seal 118 is in the form of a grommet with a pair of annular flanges 120,122 spaced apart and connected by an annular portion 124. The grommet 118 is received on the end wall 98 with the flanges 120,122 on opposite sides of the wall 98 to prevent gas from separating the seal 118 from end wall 98 during charging and discharging of the spring 20. Preferably, the seal 118 is molded in place around the end wall 98 and outlet 90 to provide effective sealing of a valve body 80 having a small outlet end effective area $A_2$ and is preferably constructed of a flexible, durable and resilient elastomeric material such as urethane. To permit the filler valve 22 to bleed gas from the cylinder chamber 30 when valve body 80 is in the retracted or bleed position (FIG. 3), a bleed passage 126 in the housing 82 communicates the valve cavity 86 in the housing 82 with the atmosphere exteriorly of the housing 82.

The valve body 80 is journalled in the housing 82 by a main cylindrical portion 128 slidably received in the valve cavity 86 and has a shank portion 130 with a reduced diameter less than the diameter of the cylindrical portion 132 of the cavity 86 to define between them an annular channel communicating with the bleed passage 126 so that when the valve is in its open position compressed gas in the cylinder chamber 30 can bleed to the atmosphere. The core valve 84 is received in a passage 134 through the body 80 and is releasably retained by a threaded portion 136 in passage the 134. A seal is provided between the housing 82 and the body 80 by a backing ring 138 and an O-ring 140 received on a shoulder 142 in the body 80.

The core valve 84 has a stem 148 slidably received in a generally cylindrical body 150 and connected to a valve head 52 at its opposite end which is yieldably biased by a spring into a normally closed position and sealing engagement with a seat. A suitable core valve is a commercially available filler core valve such as for airplane struts and accumulators.

To ensure that during charging of the chamber 30 with gas and normal operation of the spring 20, the annular nose or tip 146 of the valve body 80 is urged into firm sealing engagement with seal 118, the effective area, $A_1$, of the inlet end of the valve body is greater than the outlet effective area, $A_2$ of the nose 146. Preferably, the inlet end effective area, $A_1$, is equal to the cross sectional area of the body portion 128 or the core of the portion of the cavity 86 in which it is received. When the valve body 80 is in the sealed position, the outlet effective area, $A_2$, is equal to the cross sectional area of the passage 134 and does not include the area of the nose 146 of the body 80. Preferably, the ratio of the inlet effective area to the outlet effective area, $A_1:A_2$, ranges from greater than 1:1 up to about 8:1 and is preferably about 6:1 to enable the piston rod 24 and head 26 to substantially compress the gas within the chamber 30 during operation to a high maximum operating pressure when the rod 24 is in its fully retracted operating position.

The bleed pressure and the maximum pressure to which the gas in the chamber 30 can be compressed is a function of the ratio of these effective areas, $A_1:A_2$, and the pressure of the gas in the supply line 104 being exerted against the inlet end effective area, $A_1$, of the valve 22. When the force $F_2$ produced by the pressure of the gas within the chamber 30 acting on the area $A_2$ exceeds the force $F_1$ produced by the pressure of the gas supplied to the inlet 88 acting on the area $A_1$ including the force of the gas acting against the spring-biased core valve 84, the valve body 80 is displaced from the sealed position, shown in FIG. 2, toward the bleed position shown in FIG. 3, breaking the seal between the valve body 146 and the seal 118 and allowing gas to be discharged from the chamber 30 to the atmosphere through the annular channel between valve portion 130 and the housing 82 and out the bleed passage 126. When the valve initially opens, the body 80 is rapidly moved to its fully open position because the outlet end effective area, $A_2$, exposed to the gas within the chamber 30 substantially increases since it now includes the area contributed by the nose 146 of the valve body 80. This also insures that the poppet valve body 80 remains in the open bleed position as long as the line pressure is suitably reduced until a substantial pressure drop within the chamber 30 occurs.

In use, the filler valve assembly 22 is easily inserted into a threaded cavity 76 in the cylinder end cap 34 using a tool engaging the flats 108 on the housing 82 and is also similarly easily inserted into the threaded valve cavity in a gas spring, such as disclosed in U.S. Pat. No. 4,838,527, for retrofit use therewith. The coupling 102 of a gas supply line 104 may be connected to the threaded portion 100 of the housing 82 adjacent inlet 88 using suitable wrenches. The coupling 102 urges the axially outer face 115 of the gas supply line nozzle 116 into firm engagement with the O-ring 112 to produce a gas-tight connection between the two fittings.

To charge the gas spring 20, pressurized gas is introduced into the gas chamber 30 from the supply line 104 through core valve 84. As gas is applied to the core valve 84, its stem 148 is displaced axially inwardly lifting valve head 152 from its seat and permitting gas to flow through passage 134, passage 78 and into the gas chamber 30 to charge the spring 20. During the charging of spring 20, the pressure of the gas in the supply line 104 acting against the area $A_1$ of the inlet end of the valve body 80 forces the nose 146 of the body 80 into firm engagement with the seal 118, as is shown in FIG. 2, to prevent gas from escaping from the chamber 30 out the bleed passage 126.

When the chamber 30 is fully charged, the spring biased valve head 152 of the core valve 84 reseats preventing gas flow from the chamber 30 in a reverse direction, the line pressure acting against $A_1$ seals valve body 80 against seal 118, and the gas spring 20 is ready for use. Typically, it is used in sheet metal forming dies (not shown) in a press to hold down the sheet metal blank while it is being cold formed or stamped. As the dies close, the piston rod 24 is retracted into the cylinder chamber 30 compressing the gas therein which substantially increases the pressure within the chamber 30.

In normal operation, the maximum pressure within the gas chamber is insufficient to move the valve body 80 to its open position, and thus the gas within the chamber 30 is not relieved preventing gas pressure pulses within the chamber 30 from being transmitted to the gas supply line 104. However, if due to a malfunction during operation the maximum pressure of the gas in the chamber 30 exceeds the ratio of the areas, $A_1/A_2$, times the pressure of the gas in the supply line 104, the valve body 80 will move to the open position bleeding gas in the chamber 30 to the atmosphere substantially reducing the pressure therein. This provides a construction in which the maximum chamber pressure that causes the valve to open can be low enough to prevent overloading of the chamber walls and destruction of the gas spring. For example, if the ratio of the areas, $A_1:A_2$, is 6:1 and the gas pressure in the supply line is 2,000 PSI, the valve body 80 would not open unless the maximum pressure of the gas in the chamber 30 exceeded 12,000 PSI. Preferably, under these operating conditions, the chamber 30 and rod 24 and head 26 is of the size and construction to provide an operating pressure within the chamber 30 that is less than the maximum chamber pressure of the valve 22, such as 10,000 PSI, and the tube wall and other component parts of the spring 20 defining the chamber 30 are constructed to provide a burst strength able to withstand a chamber pressure much greater than the maximum pressure of the valve 22, such as 18,000 PSI. Consequently, during normal operation, the valve body 80 would not open to reduce the maximum pressure in the chamber 30, and in the event of a malfunction resulting in the chamber pressure exceeding 12,000 PSI, the valve 22 would open and bleed gas in the chamber 30 to the atmosphere so that the maximum pressure within the chamber 30 could not exceed the strength of the tube wall and other component parts defining the chamber 30, and damage or destroy the gas spring 20.

When it is desired to change the pressure to which the chamber 30 is charged, preferably, the pressure in the supply line 104 is greatly reduced, for example to 0 PSI, which causes valve body 80 to open and bleed gas from within the chamber 30 until the pressure within the chamber 30 reaches atmospheric pressure. After compressed gas is again supplied through the supply line 104 to the gas spring 20 to recharge it to a new desired pressure, such as 1,500 PSI, thereafter the gas spring 20 can be operated in its normal manner previously described.

What is claimed is:

1. A gas spring comprising a cylinder defining at least in part a gas chamber, a rod with a head telescopically received in said cylinder and movable between extended and retracted positions and constructed and arranged to compress a gas within said chamber when moving from its extended position toward its retracted position, and a gas passage in communication with said cylinder and opening to the exterior of said cylinder, a filler valve having a housing exterior of the cylinder with a passage therethrough defining a valve cavity having an inlet and an outlet in communication therewith and a bleed passage in said housing in communication with said valve cavity and opening exteriorly of said housing, said housing constructed and arranged to be operably associated with the gas spring with said outlet in communication with said gas passage, a valve body having generally opposed ends constructed and arranged to be slidably received in said valve cavity for movement between a first position to prevent said outlet from communicating with said bleed passage and a second position disposed from said first position so that said outlet is in communication with said bleed passage to permit gas flow through said outlet and bleed passage to reduce the pressure of gas within the chamber and said valve body having a passage therethrough in communication with said inlet and said outlet of said housing, an inlet valve carried by said valve body for allowing gas to flow through said passage to charge the chamber with gas, said inlet valve being normally closed and opening in response to gas supplied to said valve cavity upstream of said valve through said inlet at a pressure substantially greater than the pressure of gas in the chamber and closing when the gas pressure in the chamber approaches such upstream pressure, and a seal associated with said housing and disposed between one end of said valve body and said outlet for sealing against said valve body when in said first position to prevent said outlet from communicating with said bleed passage, whereby said valve body has a first effective area communicating with said inlet in said housing and a second effective area communicating with said outlet in said housing, said second effective area being smaller than said first effective area and constructed and arranged so that when gas under pressure is applied to said valve cavity through said inlet upstream of said inlet valve and said valve body is in said first position, said valve body is moved toward its second position only when the force acting on said valve body in a direction tending to cause movement of said second body toward said valve position as a result of the pressure of said gas downstream of said inlet valve acting on said second effective area of said valve body exceeds the force acting on said valve body in a direction tending to cause movement of said valve body toward said first position due to the pressure of the gas applied upstream of said inlet valve acting on said first effective area of said valve body.

2. The gas spring of claim 1 wherein the ratio of said first effective area of said valve body to said second effective area is in the range of about 5:1 to about 8:1 for enabling gas downstream of said inlet valve to be compressed up to a pressure of at least five times the pressure of gas upstream of said inlet valve.

3. The gas spring of claim 1 wherein the ratio of said first effective area of said valve body to said second effective area is about 6:1 for enabling gas downstream of said inlet valve to be compressed to a pressure of about six times the pressure of gas upstream of said inlet valve.

4. The gas spring of claim 1 wherein said inlet valve is a core valve of conventional construction.

5. The gas spring of claim 1 wherein said housing has a first exteriorly threaded portion adjacent said inlet for threadably receiving a coupling of a supply line and a second exteriorly threaded portion adjacent said outlet for being threadably received in the spring with said outlet in communication with the passage in the spring, said threaded portions are spaced axially apart from each other and disposed between them are parallel flats constructed and arranged for engagement by a tool.

6. The gas spring of claim 5 wherein said flats have a distance between parallel flats of not more than about $\frac{5}{8}$ of an inch.

7. The gas spring of claim 5 wherein said housing has an axial distance from its inlet end to said second threaded portion adjacent said outlet of not more than one inch.

8. The gas spring of claim 5 wherein said housing has an overall axial length of not more than 1.75 inches.

9. The gas spring of claim 8 wherein said housing has an overall axial length of not more than about 1.1 inches.

10. The gas spring of claim 1 wherein said housing has an exterior configuration of a standard flow-through type coupling.

11. For a gas spring having a cylinder defining at least in part a gas chamber, a rod with a head telescopically received in the cylinder and movable between extended and retracted positions and constructed and arranged to compress a gas within the chamber when moving from its extended position toward its retracted position, and a threaded gas passage in communication with the cylinder and opening to the exterior of the cylinder, a filler valve comprising a housing exterior of the cylinder having a passage with an inlet and an outlet in communication therewith and a bleed passage in said housing in communication with said passage and opening exteriorly of said housing, said housing having a first exteriorly threaded portion for matingly engaging the threaded passage in the spring with said outlet in communication with the gas passage and a second exteriorly threaded portion at its opposite end for matingly engaging a fitting of a gas supply line with said gas supply line in communication with said inlet and said housing having an overall axial length not greater than about 1.75 inches, a valve body with generally opposed ends constructed and arranged to be slidably received in said passage in said housing for movement between a first position to prevent said outlet from communicating with said bleed passage and a second position disposed from said first position so that said outlet is in communication with said bleed passage to permit gas flow through said outlet and bleed passage to reduce the pressure of gas within the chamber, and an inlet valve carried by said valve body for allowing gas to flow through said inlet valve to charge the chamber with gas, said inlet valve being normally closed and opening in response to gas supplied upstream of said valve through said inlet at a pressure substantially greater than the pressure of gas in the chamber and closing when the gas pressure in the chamber approaches such upstream pressure, said body having a first effective area in communication with said inlet and a second effective area in communication with said outlet with said first effective area being greater than said second effective area for urging said body to said first position when the pressure acting on said first effective area is greater than the pressure acting on said second effective area, and moving said body to said second position to permit said outlet to communicate with said bleed passage to vent gas from the chamber out said bleed passage when the pressure acting on said second effective area is substantially greater than the pressure acting on said first effective area.

12. The gas spring of claim 11 wherein the ratio of said first effective area of said valve body to said second effective area is at least 6:1.

13. A filler valve for a gas spring having a threaded bore in communication with a gas inlet comprising a housing having a passage therethrough with an inlet and an outlet in communication therewith and a bleed passage in said housing in communication with said passage and opening exteriorly of said housing, said housing having a first threaded portion for matingly engaging with the threaded bore to provide a gas tight seal therebetween with said outlet in communication with the gas inlet in the spring and a second threaded portion at its opposite end for matingly engaging a fitting of a gas supply line to provide a gas tight seal therebetween with said gas supply line in communication with said inlet in said housing, and a valve assembly received in said passage for permitting gas flow through said inlet, passage and outlet so long as the pressure of gas upstream of said valve assembly is substantially greater than the pressure of gas downstream of said valve assembly and bleeding gas downstream of said valve assembly through said bleed passage when the pressure of gas downstream of said valve assembly becomes substantially greater than the pressure of gas upstream of said valve assembly.

14. The filler valve of claim 13 wherein said housing also comprises a pair of parallel flats between said exteriorly threaded portions constructed and arranged to receive a tool, and said housing has an axial length from the inlet end of said housing to said first threaded portion adjacent said outlet of not more than one inch.

15. The filler valve and fitting of claim 13 wherein said threaded portions of said housing have a nominal diameter of no greater than 0.75 inches.

16. The filler valve and fitting of claim 13 wherein said housing has an exterior configuration substantially the same as that of a commercially available flow-through type coupling.

17. The filler valve and fitting of claim 16 also comprising an annular groove in the axially outer end of said housing adjacent said inlet and an annular sealing gasket received in said groove and said threaded portion adjacent said inlet having a 9/16 inch nominal diameter with 18 threads per inch for sealingly engaging said gas supply fitting.

18. The filler valve and fitting of claim 14 also comprising an annular sealing gasket received between said threaded portion of said housing adjacent said outlet and said flats and said threaded portion having a 7/16 inch nominal diameter with 20 threads per inch for sealingly engaging the threaded bore in the gas spring.

19. The filler valve and fitting of claim 14 also comprising an annular sealing gasket received between said threaded portion of said housing adjacent said outlet and said flats and said threaded portion having an ½ inch nominal diameter with 20 threads per inch for sealingly engaging the threaded bore in the gas spring.

20. The filler valve and fitting of claim 14 wherein said threaded portion adjacent said outlet has American National Standard Taper Pipe threads and an ⅛ inch nominal size with 27 threads per inch for sealingly engaging the threaded bore in the gas spring.

21. The filler valve and fitting of claim 14 also comprising an annular groove between of said flats and said threaded portion adjacent said outlet, an annular sealing gasket received in said groove, and said threaded portion adjacent said outlet having a ⅛ inch nominal size with 28 threads per inch for sealingly engaging the threaded bore in the gas spring.

* * * * *